Figure 15:
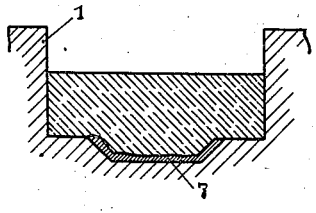

Nov. 25, 1941.  W. OSENBERG  2,264,003
PROCESS FOR INCORPORATING METAL IN RESIN STRUCTURES
Filed Dec. 24, 1937   2 Sheets-Sheet 1
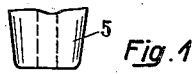
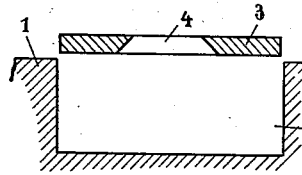
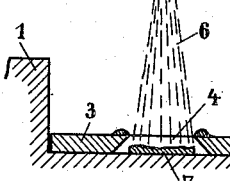
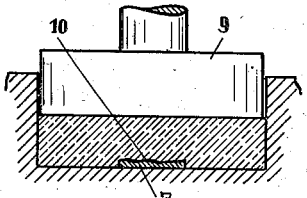
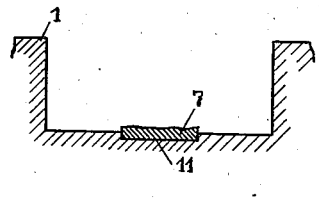
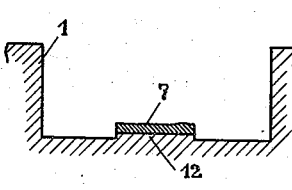
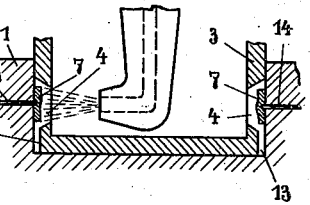
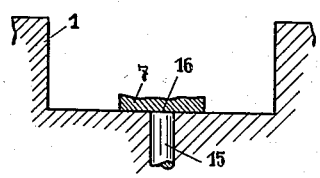
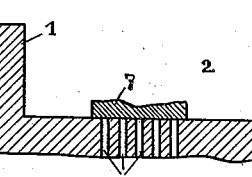
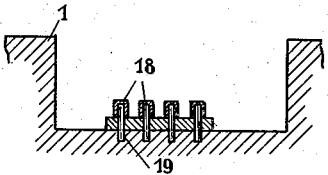
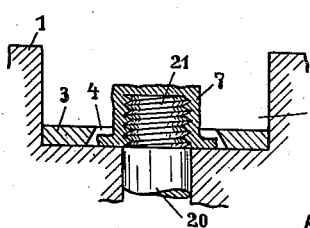
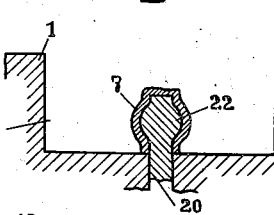
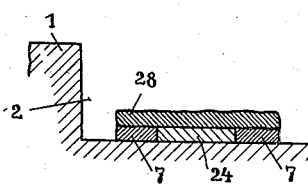
Werner Osenberg
Dean, Fairbank and Hirsch
Attorneys Nov. 25, 1941.   W. OSENBERG   2,264,003
PROCESS FOR INCORPORATING METAL IN RESIN STRUCTURES
Filed Dec. 24, 1937   2 Sheets-Sheet 2

Werner Osenberg
Dean, Fairbank and Hirsch
Attorneys

Patented Nov. 25, 1941

2,264,003

UNITED STATES PATENT OFFICE 2,264,003

PROCESS FOR INCORPORATING METAL IN RESIN STRUCTURES

Werner Osenberg, Dresden, Germany

Application December 24, 1937, Serial No. 181,662

9 Claims. (Cl. 18—59)

Electrical outlet elements are usually made with a base or carrier and electrical conducting parts mounted thereon, such, for instance, as screw sockets for light bulbs, tubes for radio devices or the like or plug-in sockets and switch parts for outlet boxes, plugs for the corresponding outlets, contact tongues and the like. The carrier is of non-conducting material, for instance, a ceramic mass.

The practice of forming electrically conducting parts on a non-conducting carrier is known, which consists, in general, to apply a conducting metal layer immediately upon the carrier and chiefly upon correspondingly formed projections, depressions or the like, for which purpose, the familiar spray process is particularly suitable, such as the Schoop metal spray process.

If the carrier is of ceramic material, the sprayed on thin metal layer will adhere in practice with sufficient security, because the surface of the carrier has a certain roughness which is favorable to such adhesion and the ceramic material can easily withstand the heat of the sprayed on metal without alteration in the constitution of its surface. In many cases, however, the carrier is of synthetic material, as for instance, synthetic resins, cellulose plastics or the like, in which case, the carrier is produced in a mold or can be cast or sprayed into the mold.

Such carrier bodies have the corresponding smooth walls of the mold and their surface is plain and smooth so that a sprayed on metal layer will not adhere securely thereto. Moreover, the surface of carrier bodies thus formed is not sufficiently resistant to the temperatures occurring in the spraying process, so that in practice, alterations will occur in the surface of the carrier, which lead to detachment of the sprayed on more or less thin metal layer, which is, of course, objectionable, since it is vital that the conducting layer on the carrier body must by all means be lodged tight if the electric element is to accomplish its purpose. According to the present invention, these objections are overcome by applying the metal layer in the first place at the parts desired of the wall of the mold, and thereupon introducing the material of the carrier body of synthetic material into the mold by pressure molding or casting or spraying.

In removing the finished piece from the mold, the conducting metal layer adheres to the carrier body and strips readily from the wall of the mold. The adhesion to the carrier body is promoted by the expedient that the metal layer in the mold wall has the side thereof facing the carrier extraordinarily rough and, therefore, becomes intimately combined with the molded material of the carrier body; the release of the metal layer from the mold wall is promoted in that the mold wall is entirely smooth and to further promote such release, the wall of the mold, may prior to application of the metal layer be treated with grease, graphite or the like.

In the drawings:

Fig. 1 is a diagrammatic view in longitudinal cross-section indicating the mold, the stencil and the nozzle in alignment, Fig. 2 is a view similar to Fig. 1 illustrating the mode of spraying the metal against the wall of the mold, Fig. 3 is a view similar to Fig. 1 illustrating the operation of pressure molding the resin or plastic in the mold, Fig. 4 is a view in longitudinal cross-section of a modified form of mold with the metal contact sprayed thereinto, Fig. 5 is a view similar to Fig. 4 of a modification, Fig. 6 is a view similar to Fig. 2 of a modification in which metal layers are sprayed against the side wall of the mold, Fig. 7 is a view similar to Fig. 4 illustrating an alternative method of promoting the release of the sprayed metal from the mold wall, Fig. 8 is a view similar to Fig. 7 of a modification thereof, Fig. 9 is a view in longitudinal cross-section of a modification of the embodiment shown in Figs. 4 and 5, Fig. 10 is a view in longitudinal cross-section illustrating the formation of a sprayed metal socket in the molded mass, Fig. 11 is a view similar to Fig. 10 showing the alternative mounting means formed by the process set forth, Fig. 12 is a view in longitudinal cross-section showing the formation of a metal bushing in a molded carrier, Fig. 13 is a view in longitudinal cross-section showing the method of forming two sprayed metallic connected contacts by the method set forth, Fig. 14 is an alternative embodiment of Fig. 13, Figs. 15, 16 and 17 show views in longitudinal cross-section of alternative embodiments in which a flanged metal layer may be prepared by the new method set forth.

Figure 17:
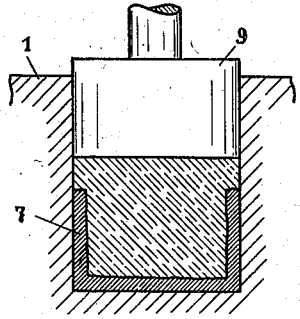
Figure 18:
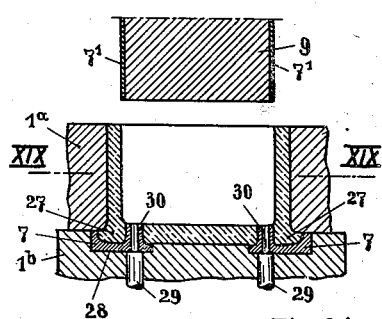
Figure 20:
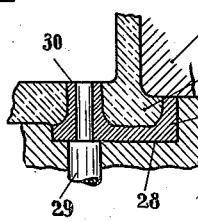
Figure 19:
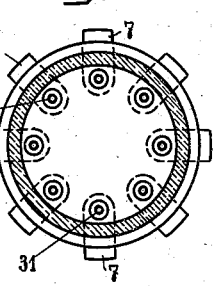
Figure 21:
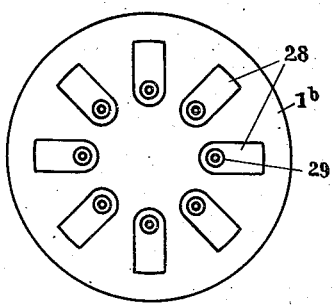
Figure 22:
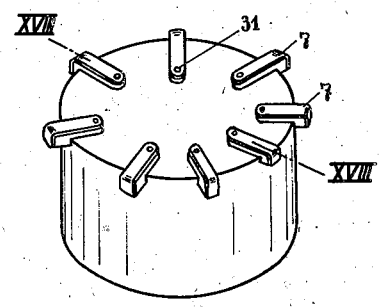
Figure 23:
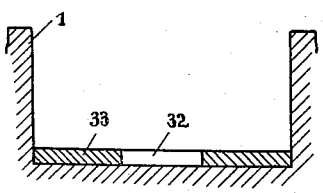
Figure 24:
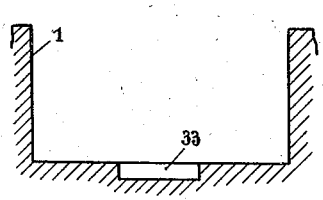
Figure 25:
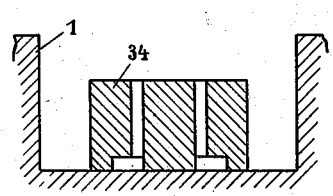

Fig. 18 is a view in longitudinal cross-section through the mold with the introduced molded body, taken insofar as the mold piece is concerned along the section line 18—18, Fig. 19 is a fragmentary view in horizontal cross-section through the completed molded body taken on line 19—19 of Fig. 18, Fig. 20 is a fragmentary view in longitudinal cross-section on an enlarged scale of the mold with the finished apparatus in place therein, Fig. 21 is a plan view of the floor of the mold, Fig. 22 is a perspective view of a radio socket, the method of forming which is shown in Figs. 17 to 21 inclusive, Figs. 23, 24 and 25 show diagrammatic views in longitudinal cross-section of alternative arrangements for applying molten metal by pouring directly into the mold.

In Fig. 1 a mold is shown with a cavity 2 rectangular in cross-section, a stencil 3 with an undercut spray opening 4 and a spray nozzle 5 which is part of a metal spraying apparatus of any desired form. In Fig. 2 it is shown how the plate 3 is laid upon the floor of the spraying mold and how the spray nozzle 5 correspondingly disposed with respect to the spray opening, hurls the metal spray jet 6 against the stencil 3. The undercutting of the spray opening 4 brings about the result that a metal layer 7 deposits upon the floor of the mold, which forms structurally completely separated from the stencil. As a result, the stencil may be readily removed from the mold after completion of the layer 7. The metal 8 which deposits at the borders of the stencil opening 4 in the spraying process may be readily scraped off said stencil after the latter has been removed.

The mass is now introduced into the mold as shown in Fig. 3 of which the carrier body is to be formed. In this embodiment, it is assumed that a pulverulent mass of synthetic resin is being used, which is to be shaken into the mold and that thereupon the pressure die 9 is applied with suitable heating of the mass to between 140 and 160 degrees C. and with the exertion of a pressure of 400 to 600 atmospheres, whereby the mass is shaped, first entering into a fluid and then passing into a solid condition in manner well known. In this operation, the metal layer 7 which is on the floor of the mold combines intimately with the mass of the carrier, since its rough surface 10 faces the carrier. In the removal of the completely formed body, the metal layer will readily rise from the smooth mold wall and at the corresponding surface of the carrier a place is afforded which is provided with an electrically conducting layer embedded in the carrier. While in the process shown in the embodiments of Figs. 1 to 3, the conducting layer is bonded to the surface of the carrier, the embodiment of Fig. 4 shows the floor of the mold provided with a depression 11 into which the metal layer is sprayed in such manner as to cause such layer to protrude above the floor of the mold and so protrude from the depression. If the mold body is then formed, it will upon completion, afford at its surface a conducting layer 7 in the form shown, raised above the surface of the carrier, which is frequently requisite in electric units.

Conversely it may be desired to produce the conducting layer in the base of a depression in the carrier. In that case, as shown in Fig. 5, the floor of the mold is provided with a projection 12 upon which the conducting layer 7 is formed in the spraying process. If now the molded mass is applied and formed, the depression is simultaneously produced therewith in the bottom of which the conducting layer 7 will be located upon removal of the completed carrier body from the mold.

Of course, several parts of the wall of the mold may simultaneously be provided with conducting facings in which operation, either the floor or the side walls of the mold or both may be used. In Fig. 6 is shown how the side walls of the mold I may be provided with conducting areas 7 at two parts and by means of the spray process. For this purpose, of course, the stencil 3 must have a corresponding form which in the case of a depression of rectangular cross-section, must be U-formed and afford two undercut spray openings 4. The lower part of the stencil is reduced as at 13, so that the stencil in its removal may pass the conducting layer applied to the wall. The adhering conducting layer 7 formed on the walls of the mold are securely gripped in the shaping and flowing of the plastic mass under high pressure. To avoid displacement of the layer 7, steel rods 14 are set into the wall mold, which protrude slightly from the wall of the mold and at their ends extend into the sprayed-on layer 7. These rods securely retain the layer 7 in position during the molding operation, and prior to removal of the mold body are drawn outward. The small holes thus formed upon the surface of the metallic layer are not objectionable in practice.

Although, in general, the metal layer formed upon the smooth wall of the mold is readily releasable therefrom, especially when the mold is treated with grease or graphite or the like, it is yet advantageous in many cases to provide special means for further promoting the release of the sprayed sheath from the mold wall. In the embodiment of the process shown in Fig. 7, a die 15 protruding through the mold wall serves as a release means. The end surface 16 of this die lies flush during the spraying on of the metallic layer with the surface of the mold wall, in this case the floor of the mold. Upon completion of the molding of the carrier, the plunger is moved to the interior of the mold and thereby aids the removal of the molded body from the floor and the release of the metal layer 7 from the wall of the mold respectively.

Another method serving for the like purpose is shown in Fig. 8 of the drawings. Here fine air canals 17 are provided at the corresponding portion of the mold wall through which after the molding of the body, compressed air is blown whereby the release of the metal layer 7 with respect to the mold wall is advanced. In practice the atomized metal will not enter the air channels in the spraying operation, if the latter are correspondingly fine, that is, corresponding small diameter.

In order further to enhance the adhesion of the metal layer 7 to the wall of the carrier, it is possible, as shown in Fig. 9, loosely to introduce small metal rods 18 into the wall of the mold or into small bores therein respectively, such rods protruding to the interior of the mold and being of length such that they may protrude forward beyond the sprayed on metal layer 7. These rods become anchored in the molded mass of the carrier body and thereby afford a secure seat for the metal layer 7 at the surface of said carrier body. The ends 19 of the rods which protrude beyond the metal layer 7 after removal of the completed molded body, which previously were lodged loosely in the openings of the mold wall, may readily be removed by filing, clipping or shearing off.

In Fig. 10 is shown an embodiment in which conducting parts with a predetermined bore, may readily be produced directly on the molded carrier body according to the new process. In this case, a core piece 20 is introduced into the wall of the mold (in the embodiment shown in the floor of mold 1), the threaded part 21 of which protrudes into the mold and through the opening 4 in the stencil 3. In spraying, a metal layer 7 is formed not only upon the wall of the mold, but also upon the part 21 of the core piece 20, which protrudes into the mold. If now, after removal of the stencil 3, the molded body is pressed in the mold, the metal layer part 7 becomes embedded therein and affords a tapped interior. The core piece 20 may now be removed by unscrewing, and the completed carrier body is thus provided with a conducting part in which the threaded socket of the lamp or radio tube may be screwed in.

In the embodiment shown in Fig. 11, the core piece 20 introduced into the wall of the mold, is shown with an enlarged or bellied part 22 projecting into the mold. In the application of the spray process, a metal layer 7 forms about said core piece, which interiorly corresponds to the bellied portion 21. In this case, the material, which is prepared, for instance, of plaster-of-Paris, wood or the like, may be readily removed from the completed unit by breaking and destroying the same. There is produced in the molded body, a depression of predetermined contour provided with an electrically conducting covering into which an element having tongues with complementary contour may be introduced thereby to afford a contact.

If the molded carrier body is to be provided with a bore therethrough the wall of which is to have a conducting lining, the process shown in Fig. 12 may be followed. In this case a plunger 23 is used, which penetrates the molding die proper shown at 9, as well as the mass introduced to be molded and extends into the wall of the mold 1. In executing the spraying process, it is possible to produce a metal layer 7 upon the floor of the mold with the aid of the stencil, but the plunger 23 itself may be surrounded by a metal layer 7 up to a desired level. After completion of the molded body and removal of the plunger 23, this body is found to have a bore lined with a conducting layer 7 in which this conducting layer protrudes over the molded body, whereby this conducting lining in the molded body, protrudes at the lower end that rests against the wall of the mold.

Frequently, it is necessary that spaced conducting layers on the carrier body are to be conductively connected to each other. In the process shown in Fig. 13, that result is accomplished as follows: The metal layers 7 which are to be conductively connected by the spraying process are formed on the wall of the mold (in the illustrative embodiment on the floor of the mold). Thereupon a slide piece 24 is introduced between the two layers 7 and finally the bridge 25 of conducting material namely of metal, is superposed, which is to connect the two metal pieces 7 with respect to each other. Finally, the powdered mass is introduced and molded, whereby it takes up the layer 7 and embeds the bridge 25, the slide member 24 being drawn out of the way, so that the carrier now has two conducting pieces 7 which are conductively connected to each other.

In the process according to Fig. 14, the same result is accomplished in that a metal ball 26 is disposed upon the floor of the mold 1, which upon spraying on the metal layer 7 through the opening 4 of the stencil 3 becomes combined with the layers and subsequently in the production of the molded body will become lodged therein.

Figure 16:
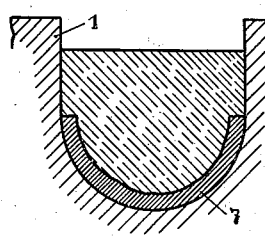

In Figs. 15 to 17 is shown a method by which metal layers 7 may be provided on the molded body or projections thereof respectively with the aid of the new process and in which the layer is in the form of a cap superposed over the body.

Where, in the illustrated examples, the mold is rectangular in profile, it is possible, as is well known to produce bodies of desired profiles by molding, spraying or casting respectively, in particular where compound molds are used. The new process renders possible to provide a conducting metal layer on any selected part of a carrier body, with the desired profile and produced in a mold form.

For instance, in Figs. 18 to 21 is shown the process for producing a tube socket for radio apparatus as shown in perspective view in Fig. 22. In this socket projections 27 are to be provided with tongue formed metal terminals. For this purpose, a two-part mold is utilized composed of parts 1—A and 1—B. In the mold part 1—B there are depressions 28 which correspond to the form of the tongue and the metal is sprayed thereinto. The tongues are provided with tubular studs 30 by means of core pins introduced into the mold, which studs become lodged in the mass to be molded. In the composite mold, the material is given the desired form by means of a correspondingly contoured pressure die, whereby the molded material becomes intimately combined with the tongues 7 and at the same time conductively lined bores 31 are formed for the introduction of electrical conducting wires.

Fig. 18 shows a longitudinal cross-section through the mold with introduced molded mass. Attention should also be called to the fact that the walls of the mold may also be provided with special platings, such as chromium, for instance, in order to enhance its smoothness and thereby to facilitate the ready release of the sprayed on covering.

In the spray process, the sprayed on layers may be of such thickness as desired; they may, for instance, be made so thick that they are capable of solder connection of other parts thereto.

Of course, it is possible to apply different metals by the spraying procedure for various metal parts to be disposed on one and the same carrier, whereby, if desired, the different coloring of the metals may serve for distinguishing the same.

Furthermore, the new process permits the provision of metal layers not only at the wall of the mold, in order to introduce the same upon the molded body, but such metal coatings may be provided on the die or plunger itself. Thus, it is possible thereby to provide a molded body in this manner with a complete metal covering by resort to the new process.

On the other hand, it is possible to introduce metallic conducting parts even in the interior of the molded body, if such molded body by the aid of a plunger or die is formed as a hollow body. For instance, in the embodiment of plunger 9 shown in Fig. 18, strip-like metal layers 7' may be provided on the sides by resort to the spray procedure, which, after completion of the molding operation, are transferred to the molded body, that is, they remain adhesively connected to its inner wall 31 and serve to provide the conductive connections with the hollow studs 30.

While in the preceding description, it has throughout been assumed that the conducting metal sheath is produced upon the wall of the mold by aid of the known metal spray proceding, the metal sheath could be produced in other manners. For instance, as shown in Fig. 23, it is possible to provide upon the floor of the mold 1 a stencil 32 of suitable material with an opening 33. Into this opening, the fluid metal may be poured. In cooling the metal layer in the opening 33 shrinks, so that the stencil 32 may be lifted out, while the metal layer remains adhesively connected to the floor of the mold; thereafter the process is completed as in the other embodiments.

In the embodiment of Fig. 24, a depressed opening 33 is provided in the floor of the mold 1, so that the use of a stencil 32 is unnecessary, since only the opening 33 need be charged with fluid metal.

In Fig. 25 is shown a process for producing the product shown in Fig. 12 by casting rather than spraying and this by resort to a mold 34.

While the various applications shown in the drawings are particularly concerned with electrical apparatus, it is understood that the method is useful in a wide variety of other applications, as, for instance, in the preparation of ornamental door knobs, window grips, oranmental buttons, vessels, pails or the like, each of which may be primarily of molded synthetic resin or the like, and may be wholly or partly covered with metal previously introduced into the mold at localized places or over the entire area thereof as indicated.

I claim:

1. The process of incorporating a metal body with a portion of the surface of a smooth insulating body of hardened resin, which consists in forming the metal body by spraying the metal in molten condition in a corresponding portion of a smooth surface mold with consequent rough surface of the metal when congealed, introducing and forming the resin in the mold, then withdrawing the formed body from the mold with the metal bonded thereto at the unfinished upper surface thereof.

2. The process of incorporating a metal body with a portion of the surface of a smooth insulating body of hardened resin, which consists in introducing into a mold and against that portion thereof corresponding to the metal body, a stencil plate, spraying molten metal into the mold through said perforated stencil to the desired thickness, removing the stencil, introducing the resin into the mold, subjecting the same to the forming and hardening treatment in which latter operation the metal body will be securely bonded to the formed body by reason of the roughness of the surface of contact and the composite body may be readily released from the smooth mold wall.

3. The process of incorporating a metal body with a portion of the surface of a smooth insulating body of hardened resin, which consists in introducing into a mold and against that portion of the mold to which the metal is to be applied, a stencil plate and also an insert surrounded by said stencil plate free from contact therewith and protruding beyond said stencil plate, spraying molten metal to the desired thickness into the mold through said stencil plate and upon said insert, removing the stencil plate, introducing the resin into the mold, subjecting the same to the forming and hardening treatment, in which latter operation the metal body will be securely bonded to the molded body and to the insert and will become readily released from the smooth mold wall.

4. The process recited in claim 2 in which the stencil opening or openings are undercut in order to avoid adhesion of the metal deposited in the mold with respect to such metal as is deposited upon the stencil.

5. The process of forming a molded body of synthetic resin, with a metal socket bonded therein, which consists in introducing into a mold, a core piece complementary to said socket, depositing molten metal about said inserted piece, to the desired thickness and after hardening of the latter, introducing the resin into the mold, forming and hardening the same, removing the formed body from the mold, and separating the core piece from the metal deposited thereabout.

6. The process recited in claim 5 in which the core is a threaded stud which may be removed by unscrewing from the metal body deposited thereon.

7. The process of forming a molded insulating body with one or more metal plates on the side wall thereof, which consists in introducing thin metal rods through the side wall of a mold at the region of said metal pieces, protruding slightly into the interior of the mold, introducing a stencil plate into the mold, having undercut walls about the respective rods and defining the areas of plates to be formed, spraying molten metal through said stencil openings about the protruding ends of the rods and to the desired thickness, removing the stencil plate from the mold, introducing the resin into the mold, forming and hardening the same, withdrawing the rods from the plates formed thereabout and then removing the formed body with its adherent metal plates from the mold.

8. The process of applying a metal element on a portion of the surface of a smooth insulating body of hardened resin, which consists in introducing small metal pins into the floor of a mold to protrude upward into the body thereof at the region where a metal plate is to be provided in the mold body, applying a stencil plate into the mold, spraying the molten metal into the mold about the upwardly protruding ends of the pins, removing the stencil plate, introducing the resin and forming it to become securely bonded with respect to the upwardly protruding pin ends and the metal plate, removing the molded body with its adhering metal element from the mold and breaking off the outer ends of the pins that protruded into the mold floor during forming.

9. The method of forming a metal socket with a multiplicity of metal contacts thereon, which consists in forming depressions corresponding to the metal contacts, in one mold element, as well as protruding pins corresponding thereto, depositing molten metal into said depressions and about said pins, to form the contacts and the mounts thereof, superposing a complementary mold, introducing resin material therein, applying a plunger to pack the resin material in the form of a socket shell for intimate engagement at its floors with respect to the metal contacts and the metal deposited about the pins, and withdrawing the same from the mold.

WERNER OSENBERG.